Figure 1:
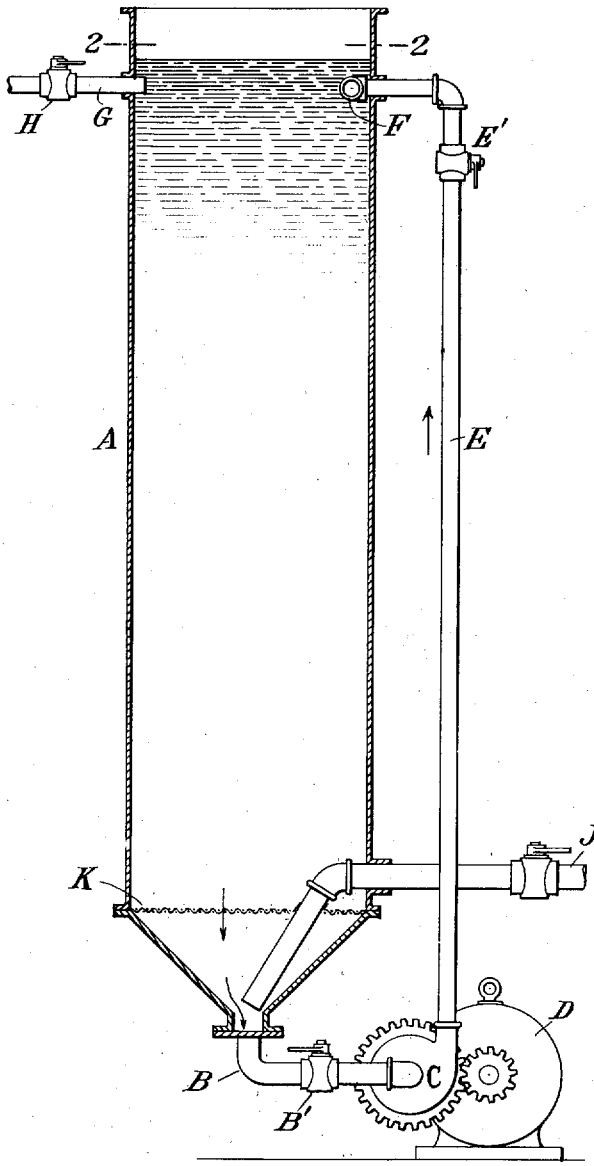

E. S. FICKES.

METHOD OF PRECIPITATING ALUMINUM HYDRATE.

APPLICATION FILED NOV. 20, 1913.

Reissued Jan. 6, 1914. 13,668.

Witnesses:
Thomas J. Byrne.
S. S. Dunham.

Edwin S. Fickes, Inventor.
By his Attorneys
Kerr, Page, Cooper & Hayward.

UNITED STATES PATENT OFFICE.

EDWIN S. FICKES, OF PITTSBURGH, PENNSYLVANIA.

METHOD OF PRECIPITATING ALUMINUM HYDRATE.

13,668. Specification of Reissued Letters Patent. Reissued Jan. 6, 1914.

Original application filed August 15, 1911, Serial No. 644,101. Renewed April 25, 1913, Serial No. 763,651. Original No. 1,070,438, dated August 19, 1913. Application for reissue filed November 20, 1913. Serial No. 802,175.

*To all whom it may concern:*

Be it known that I, EDWIN S. FICKES, a citizen of the United States, residing at Pittsburgh, county of Allegheny, State of Pennsylvania, have invented certain new and useful Improvements in Methods of Precipitating Aluminum Hydrate, of which the following is a full, clear, and exact description.

In the precipitation of aluminum hydrate from the solution commonly known in the art as sodium aluminate liquor the practice heretofore has been to subject the liquor to agitation more or less violent, by means of paddles, beaters, or similar devices working in the liquor, the universal belief being that more or less violent agitation was necessary to accomplish the precipitation of the hydrate. Inasmuch as the operation is carried on on a large scale, in tanks or vats, usually containing thousands of gallons each, it will be seen that the cost of equipping the apparatus with the necessary agitating mechanism, and of the power required to drive the same, is a considerable item. In fact it materially increases the cost of aluminum, alum, and other substances in whose production the hydrate is used. I have ascertained, however, that the precipitation is due to the presence of the precipitate in the form of particles in suspension in the liquor rather than to the agitation, so that except for its effect in keeping the particles in suspension, that is, in preventing their settling, the utility of the agitation is practically *nil*. Availing myself of this fact, I have been led to devise my present invention, which has for its chief object to provide an improved method for the precipitation to the end that the agitators or beaters hitherto employed, expensive both in first cost and in cost of operation and maintenance, may be eliminated.

In practising my method in the preferred manner, the necessary suspension of the particles in the liquor is effected by frequently or continuously withdrawing the precipitate from the bottom of the tank in which the precipitation occurs, and delivering to the liquor at or near the top. In this way all portions of the liquor are made to contain sufficient hydrate in the form of small particles to maintain the precipitation at an efficient rate.

Two of the many forms of apparatus by which the method may be practised are illustrated in the accompanying drawing, in which—

Figure 2:
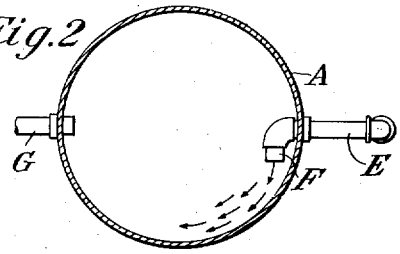
Figure 3:
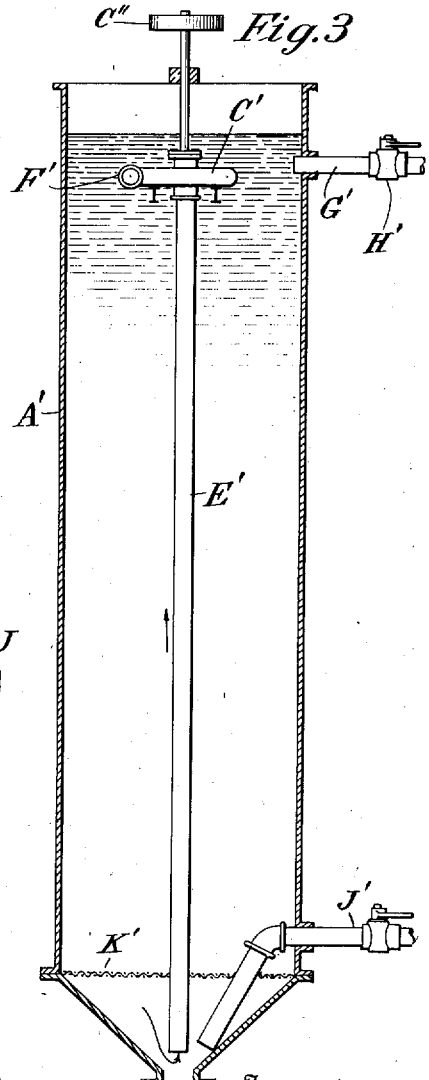

Figure 1 illustrates one form, showing the precipitating tank in vertical section. Fig. 2 is a section on line 2—2, Fig. 3 shows another form, with the tank in vertical section.

The vertical cylindrical tank A, which contains the sodium aluminate liquor, is preferably narrow in proportion to its height, and is provided with a conical or hopper bottom, to the apex of which is connected a pipe B leading to a centrifugal pump C driven by a motor D to which it is geared. From the pump a pipe E extends upwardly alongside the tank to a point near the surface of the liquid, then extends horizontally into the tank and terminates in an elbow F substantially tangential to the adjacent wall of the tank. The tanks which I am now using are 20 feet in diameter and from 70 to 80 feet high, holding 19,000 or more cubic feet of liquid. Valves B′ and E′ are provided in the pipes B and E to regulate the rate of flow therethrough.

At starting the tank is filled with liquor at a suitable degree of concentration, containing about two and a half tons of precipitated hydrate, the filling being conveniently effected through a pipe G having a valve H.

The pump C being in operation, it will be seen that a stream of liquor flowing from the bottom of the tank is carried up the pipe E and discharged into the top of the column in the tank, the direction of the discharge being tangential to the tank wall so as to produce a comparatively gentle swirling motion in the column. To minimize foaming, the pipe E discharges slightly below the surface of the liquor, as shown. Along with the stream through the pipes B and E goes a quantity of the precipitated hydrate, the particles of which, moving in a more or less spiral path after they are discharged from the pipe E, pass slowly downward through the column of liquor to the bottom of the tank, where more or less of the particles again find their way into the pipe B and are delivered again to the top of the column.

In this way all parts of the column are kept full of hydrate in the form of fine particles, and hence the formation of fresh hydrate from the solution is kept up at an efficient rate. As the precipitation continues and the liquor becomes weaker the particles precipitated become finer and finer. When the particles reach a degree of fineness such that further decrease of size would render the hydrate unsuitable for the particular purpose for which it is intended, the pump C may be stopped and the liquor and precipitated hydrate withdrawn through the pipe J for filtration; after which the tank may be refilled. Or, if desired, the withdrawal may be kept up at a slow rate while fresh liquor is introduced through the pipe G. In the latter case the highest efficiency demands that the rate of outflow through the pipe J be no faster than the maximum rate of precipitation in the tank. In any case the circulation downwardly through the main column in the tank A and upwardly through the auxiliary column in the pipe E is maintained at a rate sufficient to keep the main column substantially filled with particles of hydrate.

Inasmuch as the reactions in the liquor are accompanied by the liberation of considerable heat the temperature of the liquor may reach a point where it seriously affects the rate of precipitation, especially in large units, in which the radiating surface of the apparatus is less in proportion to the cubic contents of the tank. I prefer, however, to keep down the temperature by starting with the liquor relatively cool, say considerably below the boiling point of water, rather than employ special cooling means.

In practice the temperature of the liquor should be not less than 110° F. and not more than 160° F., the most favorable temperature being about 140° F.

As the tank is filled and emptied repeatedly the alternate expansion and contraction of the walls on account of the alternate heating and cooling thereof dislodges more or less scale from the inner surface. To prevent the scale entering the pipe B the lower portion of the tank is provided with a screen K to receive the scale as it falls, the liquor and the hydrate in suspension therein passing freely through the masses of scale and the screen. From time to time the accumulated scale is removed in any convenient manner.

In the form shown in Fig. 3, in which A′ designates the tank, the desired circulation of liquor and hydrate is effected by means of a vertical pipe E′, open at the bottom and having at the top a centrifugal pump C′ driven by a pulley C″ connected with any convenient source of power not shown. When the pump is in operation, liquor and more or less of the precipitated hydrate are drawn from the bottom of the tank, and discharged from the pump tangentially from the pump outlet F′ so as to produce a whirling or gyratory motion in the column of liquor and thus aid in keeping the particles in suspension. Near the top of the tank is a filling pipe G′ with a valve H′, and at the bottom is a valved pipe J′, through which the tank can be emptied, as explained in connection with Figs. 1 and 2. The lower part of the tank is also provided with a screen K′, like the screen K in Fig. 1 and for the same purpose.

Although the liquor may be flowing upwardly through the pipes E and E′ at a comparatively rapid rate, very little power is required to keep the stream flowing, since the upwardly moving column is counter-balanced by the downwardly moving liquor in the tank. In fact practically the only power required to keep up the circulation is that needed to overcome the friction in the tank and the pipes, which is of course comparatively slight.

In practising my process I avoid the use of heating coils and the like, for such devices would cause convection currents which would militate against the steady settling of the precipitated hydrate; whereas I want the precipitate to collect at the bottom of the column, whence it is withdrawn and delivered to the upper part of the column with as little of the liquor as possible. I am familiar with the patent of Shepard, No. 488,580, issued December 27, 1892, and among the differences between my method and the operation described in said patent is the fact that in Shepard's process the precipitated hydrate is not concentrated at the bottom of the tank and the result is that his withdrawals from the bottom consist chiefly of liquor with a minimum amount of the precipitated hydrate. This is in accordance with the principle of his method, which is to subject the liquor to intimate contact with the atmosphere of carbonic acid gas in the upper portion of the tank. To carry precipitated hydrate up into such atmosphere would of course serve no useful purpose but would militate against the efficiency of his method. On the contrary, in my method I avoid anything that tends to prevent the hydrate collecting at the conical bottom of the tank, my object being to withdraw as much precipitate and as little liquor as possible. Moreover, I do not discharge the withdrawn material into carbonic acid gas, but discharge it preferably below the surface of the column of liquor. The use of heating coils, as in Shepard's patent, causes convection currents, which militate against the precipitate collecting or concentrating, as it were, at the bottom of the tank. Furthermore, the reactions in the liquor are accompanied by the liberation of heat, as before stated, and if the temperature rises too high the rate of precipitation is diminished.

It will be understood that while the preferred form of apparatus involves the introduction of particles at the top of the apparatus by a circulation of the liquid, yet it is obvious that the invention may be practised whatever may be the method by which the particles are introduced at the top of the body of liquid. It will be understood that the invention is not limited to any particular form of apparatus, but may be practised in a variety of ways without departure from its proper spirit and scope.

I do not claim herein the process or apparatus specifically described and claimed in my copending application Ser. No. 532,818, filed December 13, 1909.

What I claim is:

1. The herein described method of precipitating aluminum hydrate, which consists in establishing a column of the liquor from which the hydrate is to be precipitated and in which is contained a quantity of precipitated hydrate in the form of fine particles, withdrawing precipitated hydrate from the lower portions of the column, and returning it to the upper portion of the column; while maintaining the column free from violent agitation and avoiding convection and like currents therein, whereby the settling precipitate collects in the lower portion of the column and thereby minimizes the quantity of liquor withdrawn.

2. The herein described method of precipitating aluminum hydrate, which consists in establishing a column of the liquor from which the hydrate is to be precipitated and in which is contained a quantity of precipitated hydrate in the form of fine particles, withdrawing precipitated hydrate from the lower part of the column and returning it to the upper part of the column, and continuing such withdrawal and return of hydrate; while maintaining the column free from violent agitation and avoiding convection and like currents, whereby the settling precipitate collects in the lower portion of the column and is withdrawn with minimum quantity of the liquor.

3. The herein described method of precipitating aluminum hydrate, which consists in establishing a column of the liquor from which the hydrate is to be precipitated and in which is contained a quantity of precipitated hydrate in the form of fine particles; and maintaining particles of hydrate in suspension throughout the column without violent agitation thereof, by continuous withdrawal of the precipitated hydrate which collects in the lower portion of the column and continuously returning the withdrawn hydrate with minimum quantity of liquor to the upper portion of the column.

4. The herein described method of precipitating aluminum hydrate, which consists in establishing a column of the liquor from which the hydrate is to be precipitated and in which is contained a quantity of the hydrate in the form of fine particles, withdrawing precipitated hydrate from the lower portion of the column, and returning the hydrate to the upper portion of the column at the side thereof in a substantially tangential direction to produce a gyratory movement in the column, to retard settling of the preciptated hydrate; while maintaining the column free from violent agitation and avoiding convection and like currents therein, whereby the settling precipitate collects in the lower portion of the column and is withdrawn with minimum quantity of liquor.

5. A method of precipitating alumina from an alkali aluminate solution, comprising the steps of maintaining a column of the aluminate solution containing a quantity of precipitated aluminum hydrate, withdrawing the aluminum hydrate from the bottom of the column and reintroducing the same at the top thereof, whereby in settling through the liquor, the particles of the precipitate come into intimate contact with substantially all portions of the aluminate liquor.

6. A method of precipitating alumina from an alkali aluminate solution, comprising the steps of maintaining a column of the aluminate solution containing a quantity of precipitated aluminum hydrate, withdrawing the aluminum hydrate from the bottom of the column and reintroducing the same at the top thereof, while avoiding violent agitation of the main body of the liquid comprising said column whereby in settling through the liquor the particles of the precipitate come into intimate contact with substantially all portions of the aluminate liquor.

7. A method of precipitating alumina from an alkali aluminate solution, comprising the steps of maintaining a column of substantially quiescent aluminate solution containing a quantity of precipitated aluminum hydrate, withdrawing the aluminum hydrate from the bottom of the column and reintroducing the same at the top thereof, whereby in settling through the liquor, the particles of the precipitate come into intimate contact with substantially all portions of the aluminate liquor.

8. A method of precipitating alumina from an alkali aluminate solution, comprising the steps of maintaining a column of the aluminate solution containing a quantity of precipitated aluminum hydrate, withdrawing the aluminum hydrate from the bottom of the column and reintroducing the same at the top thereof while avoiding heating of the aluminate solution, whereby in settling through the liquor, the particles of the precipitate come into intimate contact with substantially all portions of the aluminate liquor.

9. A process of precipitating aluminum hydrate from an alkali aluminate solution, said process comprising the step of maintaining an amount of precipitated aluminum hydrate in suspension in a body of said aluminate solution for a considerable time, while avoiding violent agitation of said solution during the major portion of said time.

In witness whereof I affix my signature in the presence of two subscribing witnesses this 19th day of November, 1913.

EDWIN S. FICKES.

Witnesses:
S. S. DUNHAM,
M. LAWSON DYER.